June 30, 1970 L. U. DWORKIN 3,518,377

PULSE CODE MODULATION TERMINAL WITH IMPROVED SYNCHRONIZING CIRCUITRY

Filed March 17, 1967

INVENTOR,
LARRY U. DWORKIN.

BY Harry M. Saragovitz, Edward J. Kelly, Herbert Berl & Julian C. Keppler
ATTORNEYS United States Patent Office 3,518,377
Patented June 30, 1970

3,518,377

PULSE CODE MODULATION TERMINAL WITH IMPROVED SYNCHRONIZING CIRCUITRY

Larry U. Dworkin, Oceanport, N.J., assignor to the United States of America as represented by the Secretary of the Army Filed Mar. 17, 1967, Ser. No. 624,676
Int. Cl. H04j 3/06
U.S. Cl. 179—15 4 Claims

ABSTRACT OF THE DISCLOSURE

This pulse code modulation terminal for demultiplexing and decoding PCM signals includes a timing circuit for producing timing pulses subharmonically related to the PCM bit frequency and a frame synch circuit for bringing said timing pulses into synchronization with the framing bits of the PCM signal. A fade detector is arranged to inhibit the operation of the frame synch circuit in response to short interruptions of the PCM signal, caused for example by fading in a radio link. This prevents frame hunting which would otherwise cause a loss of information after the PCM signal returns.

The present invention relates to a pulse code modulation (PCM) terminal and more particularly to such a terminal with improved synchronizing circuitry which will maintain its synchronization for a time after the PCM input signal disappears. This is an advantageous feature if the terminal is part of a transmission system including a radio link which is subject to fading. In the prior art systems of this type, a short loss of the PCM signal due to fading, or any other cause, would cause the synchronizing circuits of the terminal to go into a hunting mode in an effort to re-establish synchronization. Since the time required to re-establish synch may be much longer than the interval of the fade which initiated this hunting, a short fade may result in the loss of PCM data many times the length of the fade. This extra loss of information due to hunting is prevented in accordance with the present invention by providing a fade detector which senses the fundamental bit frequency of the PCM signal and inhibits the frame hunting mode of the synchronizing circuit in response to the disappearance of the PCM signal. Means are provided to carry the timing over these periods of fade so that when the PCM signal returns after a short fade, the terminal will still be synchronized and no frame hunting will be required.

It is thus an object of the invention to provide a PCM terminal with an improved synchronizing circuit.

Another object of the invention is to provide a PCM terminal which will maintain synchronization in spite of temporary loss of the PCM input signal.

A further object of the invention is to provide a PCM terminal adapted for use in a communications system which includes a radio link which is subject to fading.

These and other objects and advantages of the invention will become apparent from the following detailed description and drawings, in which.

Figure 1:
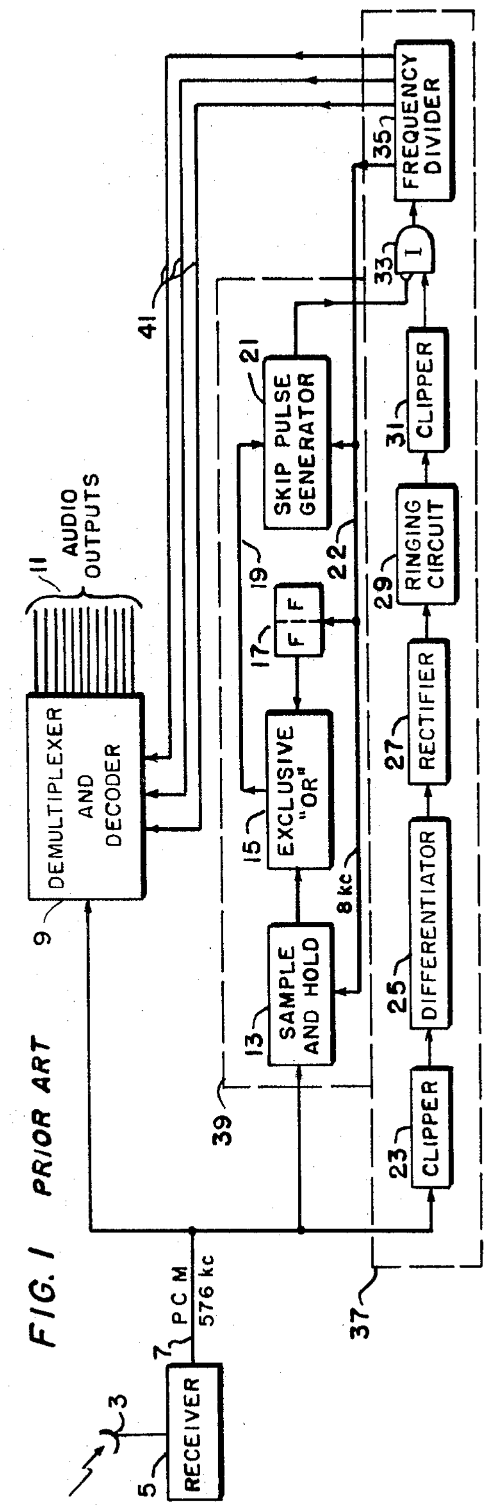
FIG. 1 is a circuit diagram of a prior art PCM terminal used to demultiplex and decode PCM signals which have been transmitted over a radio link.

A multiplexed PCM signal of the type processed by the present circuitry comprises a number of channels, for example, 6, 12 or 24. Each frame of a 12 channel PCM signal comprises 72 binary coded pulses or bits, the last bit of each frame comprising the framing bit. These framing or synchronizing bits may, for example, be alternately binary 1 and binary 0. The remaining bits comprise the time interleaved data bits of the 12 channels. If the PCM signal comprises multiplexed speech signals, the sampling frequency would be 8000 per second. Each of the 12 sampled speech waves is coded into a six-digit binary number and the binary numbers from the different channels are interleaved within each frame on a time division multiplex basis. Each frame of such an illustrative 12 channel signal would thus contain 72 bits and the frame rate would be 8000 per second, resulting in a bit rate of 576 kilocycles. In order to sort out or demultiplex such a signal, synchronization circuitry capable of identifying the beginning of each frame is required.

The prior art circuit of FIG. 1 includes an antenna 3 and a receiver 5 adapted to pick up and demodulate a radio frequency signal upon which is modulated a multiplexed PCM signal. The demodulated PCM is applied to the PCM terminal over lead 7. The PCM terminal comprises demultiplexer and decoder 9 and synchronizing circuitry comprising a frame synch circuit 39 and timing circuit 37. The synchronizing circuitry produces a plurality of timing or clocking signals on the leads 41 which are subharmonically related to the bit rate of the PCM signal and which are properly phased relative to the framing bits of the input PCM signal to accomplish the demultiplexing of the PCM signal in circuit 9. After demultiplexing in circuit 9, the individual channel signals are decoded and appear as audio signals on the twelve audio output terminals. The timing circuit 37 comprises a means to obtain a periodic signal having a frequency equal to the PCM bit rate, which in the case of the 12 channel PCM system described above would be 576 kilocycles. This bit rate signal is then frequency divided to obtain the subharmonically related timing signals of lead 41. The frame synch circuit comprises a means to bring the timing signals into synch with the framing bits by adjusting the phase of the timing signals. The frame synch circuit 39 comprises a sample and hold circuit 13, to which the PCM signal is applied, a bistable flip-flop 17 and an exclusive-or circuit 15, to which the outputs of the sample and hold circuit and the flip-flop are applied. The output of the exclusive-or circuit is applied to skip pulse generator 21. The output of the skip pulse generator is applied to the inhibit input of inhibit gate 33 of the timing circuit. The timing circuit 37 comprises a clipper 23 which squares up the PCM signal applied thereto from lead 7, a differentiator which produces spikes at the leading and trailing edges of each pulse of the PCM signal, rectifier 27 for eliminating the spikes of one polarity and yielding a train of spikes at the bit rate of 576 kilocycles. The rectifier output is applied to a resonant ringing circuit 29 tuned to the PCM bit rate. The ringing circuit thus produces a sinusoidal voltage at the bit rate. The spectrum of the PCM signal varies with the information therein, but will always have a component of varying strength at the bit rate. The ringing circuit smooths out these variations to produce a relatively constant amplitude sine wave at the bit rate. The ringing circuit output is clipped by clipper 31 and then applied to the other input of inhibit gate 33, the output of which forms the input of frequency divider circuit 35. The outputs 41 of the frequency divider are subharmonics of the input which result from the frequency dividing action of this circuit. An 8 kilocycle signal which results from a division of the 576 kilocycle input by 72 is applied to the sample and hold circuit 13, the input of flip-flop 17 and the skip pulse generator 21. The operation of the circuit is as follows: When the PCM signal is first applied to the terminal over lead 7, the clipper circuit 31 immediately produces a square wave signal at the bit frequency which passes through gate 33 to the frequency divider. The frequency divider then produces the subharmonics on outputs 41 and 22 which comprise the timing or clocking pulses. These outputs will be of the proper frequency but not necessarily properly phased with the input PCM signal, since the framing synch circuit 39 has not completed its synchronization function. It will be assumed that the framing pulses are alternately binary 1 and biary 0. The flip-flop 17 is a two-to-one frequency divider and therefore since its input from lead 22 is an 8 kilocycle video pulse train, its output to exclusive-or circuit 15 will be a symmetrical square wave of 4 kilocycles. Each of the 8 kilocycle pulses on lead 22 will cause circuit 13 to sample the instantaneous binary value (or voltage) of the PCM signal on lead 7 and hold this value of voltage until the next 8 kilocycle pulse arrives. It should be noted that the frame repetition rate is also 8 kilocycles with the illustrative PCM signal discussed above. If the pulses on lead 22 do not arrive at circuit 13 in synchronism with the framing bits on lead 7, the circuit 13 will be sampling and holding the data bits which vary with the information of the PCM signal and hence the output of circuit 13 to the exclusive-or circuit 15 will be a square wave signal of varying spectrum and waveform which will be uncoordinated with the 4 kilocycle output of the flip-flop 17. The gate 15 will therefore produce an output to skip pulse generator 21 whenever its two inputs differ. The generator 21 produces inhibiting signals at gate 33 in response to this output from exclusive or gate 15. By thus removing some of the input pulses of the frequency divider 35, the phase of all the outputs (22 and 41) thereof will be changed. Due to this phase change the circuit 13 will now be sampling at a different portion of each frame of the input PCM signal. This frame hunting mode continues in this fashion until the 8 kilocycle signals of lead 22 have slipped sufficiently in phase relative to the PCM signal on lead 7 so that the circuit 13 is sampling the framing bits of the PCM signal. Since these framing bits are alternately 0 and 1, the resulting output of sample and hold circuit will be a 4 kilocycle square wave which will be in phase with the 4 kilocycle output of the flip-flop. In this condition the inputs to exclusive-or gate 15 will always be the same, that is always both positive or both zero, and gate 15 will produce no output. Thus no more skip pulses will be produced and the phase of the timing signals from frequency divider 35 will remain constant at the proper value to demultiplex the PCM signal.

In this prior art circuit, any brief interruption of the PCM signal, caused for example by fading in the radio link, will cause exclusive-or circuit 15 to produce output pulses thus causing generator 21 to produce skip pulses, thus initiating another cycle of frame hunting. As stated above, this frame hunting often requires more time than the fading condition which initiated it, resulting in additional loss of PCM data. This conditon is corrected in accordance with the invention by adding a fade detector circuit which responds to the bit frequency of the PCM wave which inhibits the operation of the skip pulse generator in response to the loss of the PCM signal. The timing circuit is also modified to permit it to carry the timing over the fade interval so that when the PCM signal returns, no frame hunting will be required.

Figure 2:
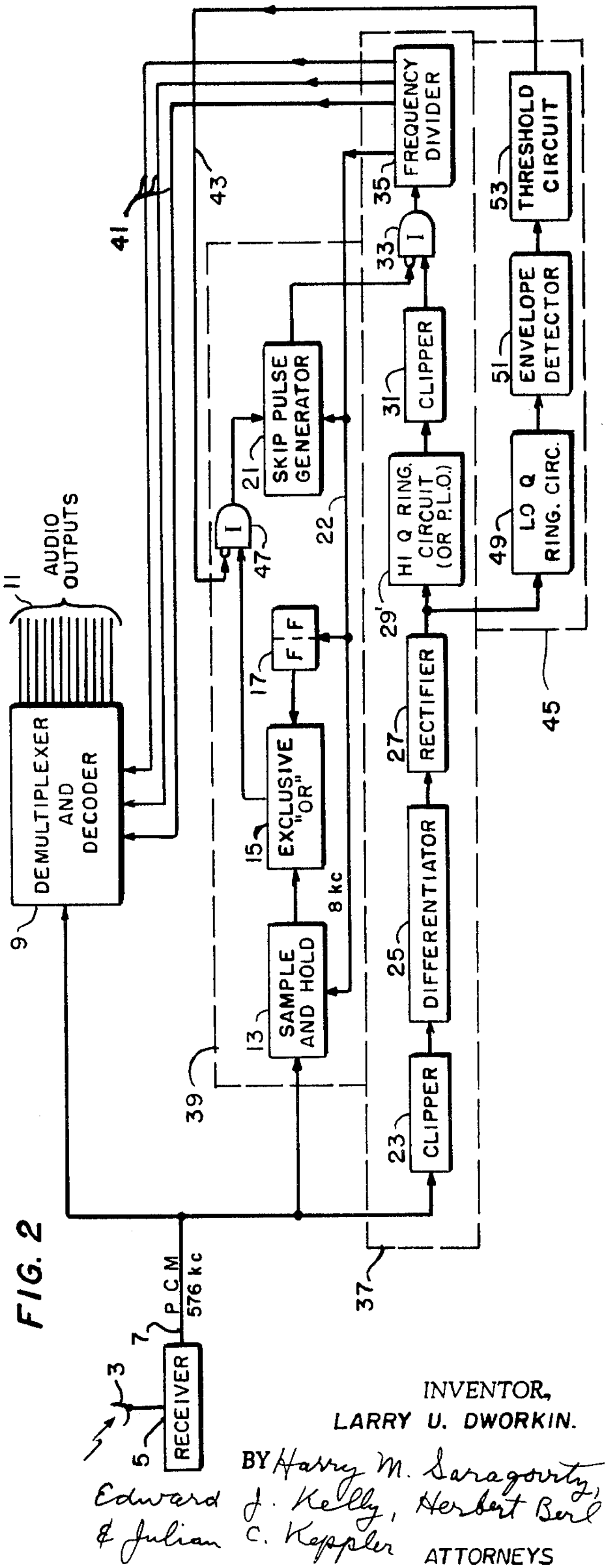
FIG. 2 shows the improved circuitry of the present invention applied to the same type of terminal.

In the improved circuit of FIG. 2 corresponding elements have been given the same reference characters as in FIG. 1. FIG. 2 is similar in operation and circuitry as FIG. 1 except for the addition of fade detector 45 and an inhibit gate 47 between the output of exclusive-or gate 15 and skip pulse generator 21. The fade detector comprises a low-Q ringing circuit 49, an envelope detector 51 and a threshold circuit 53 in cascade. The input of the ringing circuit 49 is the output of the rectifier 27 of the timing circuit and the output of the threshold circuit 53 forms the inhibit input of gate 47. The ringing circuit 49 produces a sinusoidal voltage in the same manner as does the ringing circuit 29 of the timing circuit, however the low-Q ringing circuit is highly damped so that it rings for only a short time and therefore will damp out almost immediately upon a loss of the PCM signal. For example, if the Q of circuit 49 is 1000, this circuit will ring for only .3 millisecond. The envelope detector puts out a DC voltage proportional to the AC output of the ringing circuit 49. The threshold circuit is arranged to produce no output if the output of detector 51 exceeds its threshold and to produce an inhibiting pulse on lead 43 if the output of 51 falls below its threshold. The threshold circuit may comprise a Schmitt trigger or its equivalent. Thus when the PCM signal disappears the resulting fade detector output inhibits gate 47 to prevent the generation of skip pulses which would otherwise initiate a frame hunting cycle. In addition to these circuit modifications, the ringing circuit 29′ of the timing circuit is chosen with a high-Q, which allows this circuit to ring for a time after the disappearance of the PCM signal. This ringing of circuit 29′ maintains the input to the frequency divider 35 during fades and if the PCM signal returns before the output of 29′ damps out, the timing outputs of frequency divider 25 will be properly phased with the framing bits of the PCM when it reappears, and no frame hunting will be required. The reappearance of the PCM signal will remove the inhibit pulse from the input of gate 47, allowing the frame synch circuit to function in its normal manner. Thus the Q of circuit 29′ should be high enough to carry the timing over the longest expected fade. In practice a Q of 10,000 for circuit 29′ has been found capable of carrying the timing over fades of up to 20 milliseconds. A fade detector of the type illustrated which is tuned to the fundamental PCM bit rate is advantageous because it will not respond to the wide band noise which usually replaces the PCM signal during a fade. A phase locked oscillator (PLO) in which the phase of a local oscillator is locked to that of the incoming PCM signal from rectifier 27 may be substituted for the high Q ringing circuit 29′. In this case the servo phase control loop of the phase locked oscillator would be designed with a time constant sufficient to carry the timing over the worst expected fade.

While the invention has been described in connection with an illustrative circuit and a particular PCM signal with a 576 kilocycle bit rate, these specific disclosures should not be interpreted as limiting the invention since the inventive concepts herein disclosed are of general application.

What is claimed is:

1. A pulse code modulation (PCM) terminal comprising, a source of multiplexed PCM signals which have been received over a radio link, a timing circuit comprising a high-Q resonant ringing circuit for producing an output having a frequency equal to the bit rate of said PCM signal and a frequency divider connected to the output of said high-Q ringing circuit via an inhibit gate, said timing circuit arranged to produce timing signals subharmonically related to the output of said high-Q ringing circuit, said timing signals being at the frame rate of said PCM signals, means to apply said multiplexed PCM signals to the input of said timing circuit, said timing signals being utilized to demultiplex said PCM signals, a frame synch circuit for adjusting the phase of said timing signals in accordance with the phase of the framing bits of said PCM signals, said frame synch circuit comprising a skip pulse generator connected to the inhibit input of said inhibit gate, said skip pulse generator arranged to produce pulses in response to a lack of synchronism between said timing signals and the framing bits of said PCM signal, and a fade detector circuit comprising a low-Q ringing circuit having said PCM signals connected to the input thereof, the output of said fade detector being connected to said frame synch circuit, said fade detector output being arranged to inhibit the output of said skip pulse generator in response to fading of said PCM signals.

2. A pulse code modulation (PCM) terminal comprising a demultiplexer and decoder circuit, means to apply a multiplexed PCM signal to said demultiplexer and decoder circuit, synchronization circuitry for applying timing signals to said demultiplexing and decoding circuit, said synchronizing circuitry comprising a timing circuit for producing said timing signals which are subharmonically related to the bit rate of said PCM signals and a frame synch circuit for phasing said timing signals in accordance with the phasing of the framing bits of said PCM signal, said timing circuit comprising a high-Q ringing circuit and a frequency divider in cascade, said frame synch circuit comprising a skip pulse generator for removing pulses from the input of said frequency divider in response to frame error, a fade detector having as its input said PCM signal and having its output arranged to inhibit the operation of said skip pulse generator in response to fading of said PCM signals, said high-Q ringing circuit providing synchronization during short periods of fading, and wherein said fade detector comprises a low-Q ringing circuit and an envelope detector in cascade, and wherein said skip pulse generator is inhibited in response to the absence of output from said envelope detector.

3. A pulse code modulation (PCM) terminal comprising, a timing circuit for producing timing signals at the frame rate of the PCM signals processed by said terminal, said PCM signals comprising framing bits, said timing signals being utilized to demultiplex said PCM signals, a frame synch circuit for bringing said timing pulses into synchronism with said framing bits, a fade detector arranged to sense the bit frequency component of said PCM signals and to inhibit the operation of said frame synch circuit in response to the fading of said bit frequency component, said fade detector comprising a low-Q resonant ringing circuit, said timing circuit comprising a high-Q ringing circuit capable of producing timing signals for a short period after the fading of said PCM signals.

4. The terminal of claim 3 wherein both of said ringing circuits are tuned to the bit rate of said PCM signals.

References Cited

UNITED STATES PATENTS 2,927,965 3/1960 Waer ---------------- 179—15

KATHLEEN H. CLAFFY, Primary Examiner

A. B. KIMBALL, Jr., Assistant Examiner

U.S. Cl. X.R.

178—69.5; 343—204